US012256186B2

(12) United States Patent
Rich et al.

(10) Patent No.: US 12,256,186 B2
(45) Date of Patent: *Mar. 18, 2025

(54) WIRELESS EARPHONE

(71) Applicant: Apple Inc., Cupertino, CA (US)

(72) Inventors: Zachary C. Rich, San Francisco, CA (US); Kurt R. Stiehl, San Jose, CA (US); Arun D. Chawan, San Francisco, CA (US); Michael B. Howes, Mountain View, CA (US); Jonathan S. Aase, Rochester, MI (US); Esge B. Andersen, Campbell, CA (US); Yacine Azmi, San Francisco, CA (US); Jahan C. Minoo, San Jose, CA (US); David J. Shaw, San Diego, CA (US); Aarti Kumar, San Jose, CA (US); Augustin Prats, San Francisco, CA (US); Robert D. Watson, Menlo Park, CA (US); Baptiste P. Paquier, Saratoga, CA (US); Axel D. Berny, San Francisco, CA (US); Benjamin W. Cook, San Francisco, CA (US); Jerzy S. Guterman, Sunnyvale, CA (US); Benjamin Adair Cousins, Burlington, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,069

(22) Filed: Feb. 22, 2024

(65) Prior Publication Data

US 2024/0259721 A1 Aug. 1, 2024

Related U.S. Application Data

(63) Continuation of application No. 17/827,493, filed on May 27, 2022, now Pat. No. 11,937,037, which is a (Continued)

(51) Int. Cl.
*A61F 4/00* (2006.01)
*H04R 1/10* (2006.01)

(52) U.S. Cl.
CPC ......... *H04R 1/1016* (2013.01); *H04R 1/1025* (2013.01); *H04R 1/1075* (2013.01);

(Continued)

(58) Field of Classification Search
CPC . A61B 5/0261; A61B 5/14551; A61B 5/7275; A61B 5/7455; A61F 4/00;

(Continued)

(56) References Cited

U.S. PATENT DOCUMENTS

| | | | | |
|---|---|---|---|---|
| 5,900,801 A * | 5/1999 | Heagle | ............... | G05B 23/0267 705/15 |
| 5,939,974 A * | 8/1999 | Heagle | ................... | G06Q 10/06 340/3.1 |

(Continued)

*Primary Examiner* — Gerald Gauthier

(74) *Attorney, Agent, or Firm* — Aikin & Gallant, LLP

(57) ABSTRACT

A housing has a bud portion abutting an elongated stem portion. The bud portion is to fit within an ear. The bud portion has a primary sound outlet at its far end that is to be inserted into an outer ear canal, and abuts the stem portion at its near end. A speaker driver is inside the bud portion. Electronic circuitry inside the housing includes a wireless communications interface to receive audio content over-the-air and in response provides an audio signal to the speaker driver. A rechargeable battery as a power source for the electronic circuitry is located inside a cavity of the stem portion. Other embodiments are also described and claimed.

20 Claims, 3 Drawing Sheets

Related U.S. Application Data continuation of application No. 16/790,661, filed on Feb. 13, 2020, now Pat. No. 11,363,363, which is a continuation of application No. 16/125,178, filed on Sep. 7, 2018, now Pat. No. 10,567,861, which is a continuation of application No. 15/302,163, filed as application No. PCT/US2015/026725 on Apr. 20, 2015, now Pat. No. 10,110,984.

(60) Provisional application No. 61/982,214, filed on Apr. 21, 2014.

(52) U.S. Cl.
CPC ........ *H04R 1/105* (2013.01); *H04R 2201/107* (2013.01); *H04R 2420/07* (2013.01)

(58) Field of Classification Search
CPC ............ A63B 71/0622; A63B 69/0028; G05B 23/0267; G06F 3/165; G06Q 10/06; G08B 3/1041; G09B 19/0038; H04B 1/385; H04M 1/05; H04M 1/6066; H04M 1/724; H04M 1/72457; H04N 21/8545; H04R 1/1016; H04R 1/1025; H04R 1/1041; H04R 1/105; H04R 1/1075; H04R 27/00; H04R 2201/107; H04R 2420/07; H04R 5/033; H04R 25/558; H04S 7/304; B32B 27/40
See application file for complete search history.

(56) References Cited

U.S. PATENT DOCUMENTS 6,795,718 B2 * 9/2004 Bae ......................... H04M 1/05 379/433.02
6,819,762 B2 * 11/2004 Jones ..................... H04R 1/105 379/430
6,866,915 B2 * 3/2005 Landvik .................. B32B 27/40 428/160
7,079,664 B2 * 7/2006 Nassimi ............... H04R 25/558 381/328
7,110,798 B2 * 9/2006 Nassimi .............. H04M 1/6066 455/575.2
7,155,025 B1 * 12/2006 Weffer ................... H04R 5/033 381/384
7,190,797 B1 * 3/2007 Johnston ................. H04M 1/05 381/74
7,278,734 B2 * 10/2007 Jannard ................... H04M 1/05 351/158
9,521,962 B2 * 12/2016 LeBoeuf ............ A61B 5/14551
9,526,946 B1 * 12/2016 Zets ................... G09B 19/0038
9,609,420 B2 * 3/2017 Azmi ................... H04R 1/1041
10,015,582 B2 * 7/2018 Wagner ................ A61B 5/0261
10,110,984 B2 * 10/2018 Rich .................... H04R 1/1025
10,258,259 B1 * 4/2019 Zets ..................... A61B 5/7455
10,567,861 B2 * 2/2020 Rich .................... H04R 1/1025
10,827,979 B2 * 11/2020 LeBoeuf ............ A61B 5/14551
11,363,363 B2 * 6/2022 Rich .................... H04R 1/1016
11,937,037 B2 * 3/2024 Rich .................... H04R 1/1025
2002/0131585 A1 * 9/2002 Jones ...................... H04M 1/05 379/431
2002/0149470 A1 * 10/2002 Mynatt ................ G08B 3/1041 340/10.1
2004/0055811 A1 * 3/2004 Shih ....................... H04R 1/105 181/129
2006/0223547 A1 * 10/2006 Chin ................. H04M 1/72457 455/456.1
2008/0137897 A1 * 6/2008 Liu ...................... H04R 1/1066 381/380
2009/0082994 A1 * 3/2009 Schuler ............. A63B 69/0028 702/160
2009/0109054 A1 * 4/2009 Ueda ................... H04M 1/6066 455/70
2009/0109894 A1 * 4/2009 Ueda ...................... H04B 1/385 455/7
2009/0112338 A1 * 4/2009 Ueda ................... H04M 1/6066 700/94
2009/0309747 A1 * 12/2009 Ghovanloo ............... A61F 4/00 340/686.1
2011/0096033 A1 * 4/2011 Ko ........................ H04M 1/724 345/175
2012/0139727 A1 * 6/2012 Houvener .......... A63B 71/0622 340/540
2012/0148055 A1 * 6/2012 Lee ......................... H04S 7/304 381/61
2013/0170647 A1 * 7/2013 Reilly .................... H04R 27/00 381/17
2013/0337974 A1 * 12/2013 Yanev .................. A61B 5/7275 482/8
2014/0093088 A1 * 4/2014 Tachibana ............ H04R 1/1041 381/58
2016/0011590 A1 * 1/2016 Griffiths .................. G06F 3/165 700/94
2016/0063893 A1 * 3/2016 Kanuganti ......... H04N 21/8545 348/62
2017/0064427 A1 * 3/2017 Rich .................... H04R 1/1025
2019/0007763 A1 * 1/2019 Rich .................... H04R 1/1016
2020/0260173 A1 * 8/2020 Rich .................... H04R 1/1016
2022/0295169 A1 * 9/2022 Rich .................... H04R 1/1025
2024/0259721 A1 * 8/2024 Rich .................... H04R 1/1075

* cited by examiner

WIRELESS EARPHONE

CROSS-REFERENCE TO RELATED APPLICATIONS

This application is a continuation of U.S. patent application Ser. No. 17/827,493, filed May 27, 2022, which is a continuation of U.S. patent application Ser. No. 16/790,661, filed Feb. 13, 2020, and granted as U.S. Pat. No. 11,363,363, on Jun. 14, 2022, which is a continuation of U.S. patent application Ser. No. 16/125,178, filed Sep. 7, 2018, and granted as U.S. Pat. No. 10,567,861, on Feb. 18, 2020, which is a continuation of U.S. patent application Ser. No. 15/302,163, filed Oct. 5, 2016, and granted as U.S. Pat. No. 10,110,984, on Oct. 23, 2018, which is a U.S. National Phase Application under 35 U.S.C. § 371 of International Application No. PCT/US2015/026725, filed Apr. 20, 2015, which claims the benefit of the earlier filing date of U.S. Provisional Application No. 61/982,214, filed Apr. 21, 2014, all of which are incorporated herein by reference.

FIELD

An embodiment of the invention is directed to earphones that can receive an audio signal over-the-air. Other embodiments are also described.

BACKGROUND

Wireless earphones exist that allow a user to wear a pair of earphones that are tethered to each other and that are battery powered, so that they can be electrically disconnected from an audio source device and still receive audio over-the-air, from the source device. The wireless connection may be in accordance with, for example, a Bluetooth protocol. The packaging of the electronics and other components within a low profile wireless earphone sometimes presents a challenge due to the limited space available within the housing of such an earphone.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
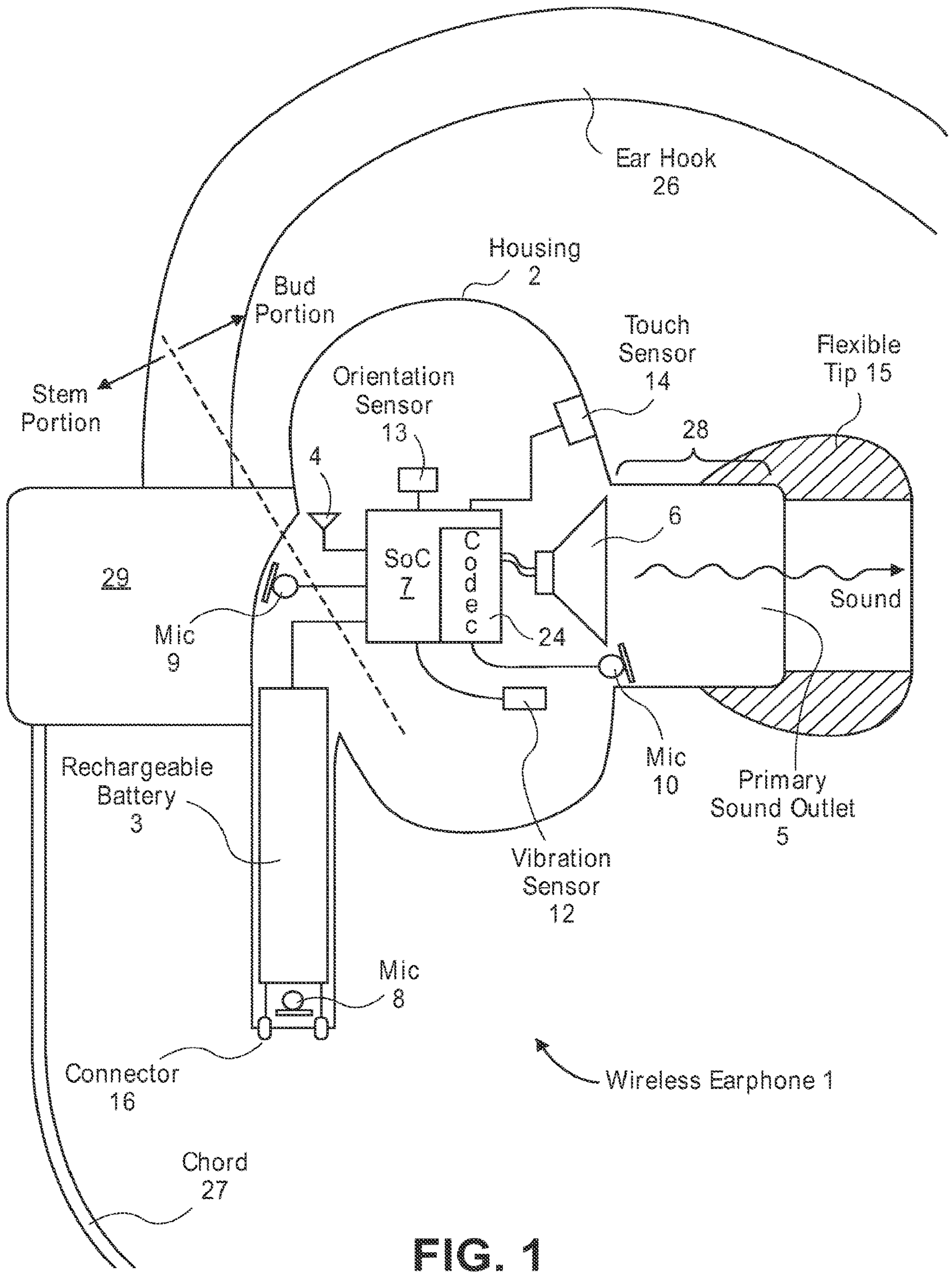
FIG. 1 illustrates a combined block diagram and side section view of a wireless earphone.

FIG. 1 is a combined block diagram and side, sectional view of a wireless earphone 1 in accordance with an embodiment of the invention. A relatively rigid housing 2, which may be made of any suitable material for consumer electronics devices, including, for example, a hard plastic, is shown as having a cavity therein in which several hardware components are positioned. The housing 2 is "rigid" relative to a flexible ear tip 15 (that may be made of a resilient material such as a foam or silicon) that has been fitted onto a spout portion 28 of the housing 2 as shown. The housing 2 is constituted by a bud or bulb portion that abuts an elongated stem portion. The bud portion is sized and dimensioned to fit within an ear, as would a typical in-ear or ear bud type of earphone. The bud portion has a primary sound outlet 5 at its far end that is to be inserted into an outer ear of a user (see FIG. 3). The bud portion abuts the stem portion at its near end, as shown by the dotted line used to illustrate the boundary there between. In the embodiment shown in FIG. 1, it can be seen that the longitudinal axis of the stem portion is vertical, while the center axis of the primary sound outlet 5 (being the wavy arrow labeled "Sound") is horizontal. The near opening of the flexible tip 15 has been fitted over the spout portion 28 as shown, aligned with the primary sound outlet 5, so that sound produced by a speaker driver 6 emerges out of the spout portion 28 and on through the far opening of the tip 15 and then into the user's outer ear canal (not shown). The speaker driver 6 is positioned inside a cavity of the bud portion and is to produce sound that will emanate out of the port 5 and into the user's ear. Electronic circuitry is found inside the housing 2, and that as described in detail below includes a wireless communications interface to receive audio content over-the-air and in response provides an audio signal (e.g., a left channel or a right channel of stereo content) to an input of the speaker driver 6. Further details regarding the electronic circuitry will be given below in connection with FIG. 2. A rechargeable power source, referred to as a rechargeable battery 3, is positioned inside a cavity of the stem portion as shown. The stem portion may be generally cylindrical, or an elongated parallelepiped, and has a cavity therein in which the battery 3 (e.g., having a lithium-based electrochemistry, and an elongated cell structure that is longer than it is wide or deep, in the longitudinal directions as shown) is positioned. In one embodiment, the battery 3 is to supply all of the needed power to the electronic circuitry of the earphone (hence allowing full operation of the wireless earphone 1 without any electrical connection to an external device).

In the embodiment shown in FIG. 1, the earphone 1 also has a rear support 29 that may be affixed to the stem portion and/or to the bud portion of the housing 2. Attached to the rear support 29 are an ear hook 26 and a chord 27. These may be of lightweight but sturdy materials that serve to more securely attach the earphone 1 to the user's ear, and to physically (not electrically) tether earphone 1*a* to another earphone 1*b* as a left and right pair that can be worn simultaneously by the user—see FIG. 3. The ear hook 26 and the chord 27 are, however, optional attachments that may be omitted (in which case the rear support 29 may also be omitted).

In another embodiment, in which the rear support 29 together with the chord 27 and ear hook 26 are omitted, the bud portion of the housing 2 may be shaped and dimensioned to snugly fit inside the ear, so as to retain the earphone 1 in that position without the need for the ear hook 26 and also without requiring the tip 15. In that case, the spout portion 28 need not be formed, such that a front face of the bud portion extends essentially flat between the near end (where the primary sound outlet 5 is formed) and the far end (where the stem portion is joined to the bud portion), and is positioned beside and in contact with the tragus of the ear. A rear face of the bud portion (not shown) may also extend similarly, between the near end and the far end, and will be facing outward (as opposed to the front face which lies against the tragus). Other suitable shapes for the bud portion that provide for a comfortable, leaky or loose fit inside a user's ear are possible.

The stem portion has a near end that is open to the cavity of the bud portion and through which a number of wires pass as shown, in order to supply power (from the battery 3) to, and information signals to and from, the electronic circuitry that is located in the cavity of the bud portion. The stem portion also has a far end, wherein the battery 3 is positioned inside the cavity of the stem portion between its near end and the far end. There is also a first acoustic microphone 8 that is positioned in the stem portion, closer to the far end than the near end of the stem portion. A connector 16, for example, a two-pin connector, is positioned in the stem portion, also closer to the far end than the near end of the stem portion. In one embodiment as shown, the first acoustic microphone 8 is positioned within the stem portion, longitudinally between a pair of conductive terminals of the connector 16 and the battery 3. Although not shown, the external surface of the far end of the stem portion may have openings formed between the terminals of the connector 16, that serve as an acoustic port and allow sound waves to reach the acoustic microphone 8.

The connector 16 is coupled to the power terminals of the battery 3 in order to deliver power to charge the battery 3 from a detachable or pluggable, external power source (not shown). The connector may have a pair of conductive terminals that are exposed at an external surface of the far end of the stem portion as shown, to conduct electrical power from the plugged-in external power source, to charge the battery 3 that is inside the stem portion. In addition, the same connector 16 may be coupled to the electronic circuitry in the housing 2, to transfer data communications signals between for example the SoC 7 (described below) and a detachable or pluggable, external device (e.g., a docking station, in accordance with a computer peripheral communications protocol such as Universal Serial Bus). In other words, the connector 16 can be shared or dual purposed for providing power to charge the battery 3 from a pluggable external source, and for wired data communications with a pluggable external source.

Figure 2:
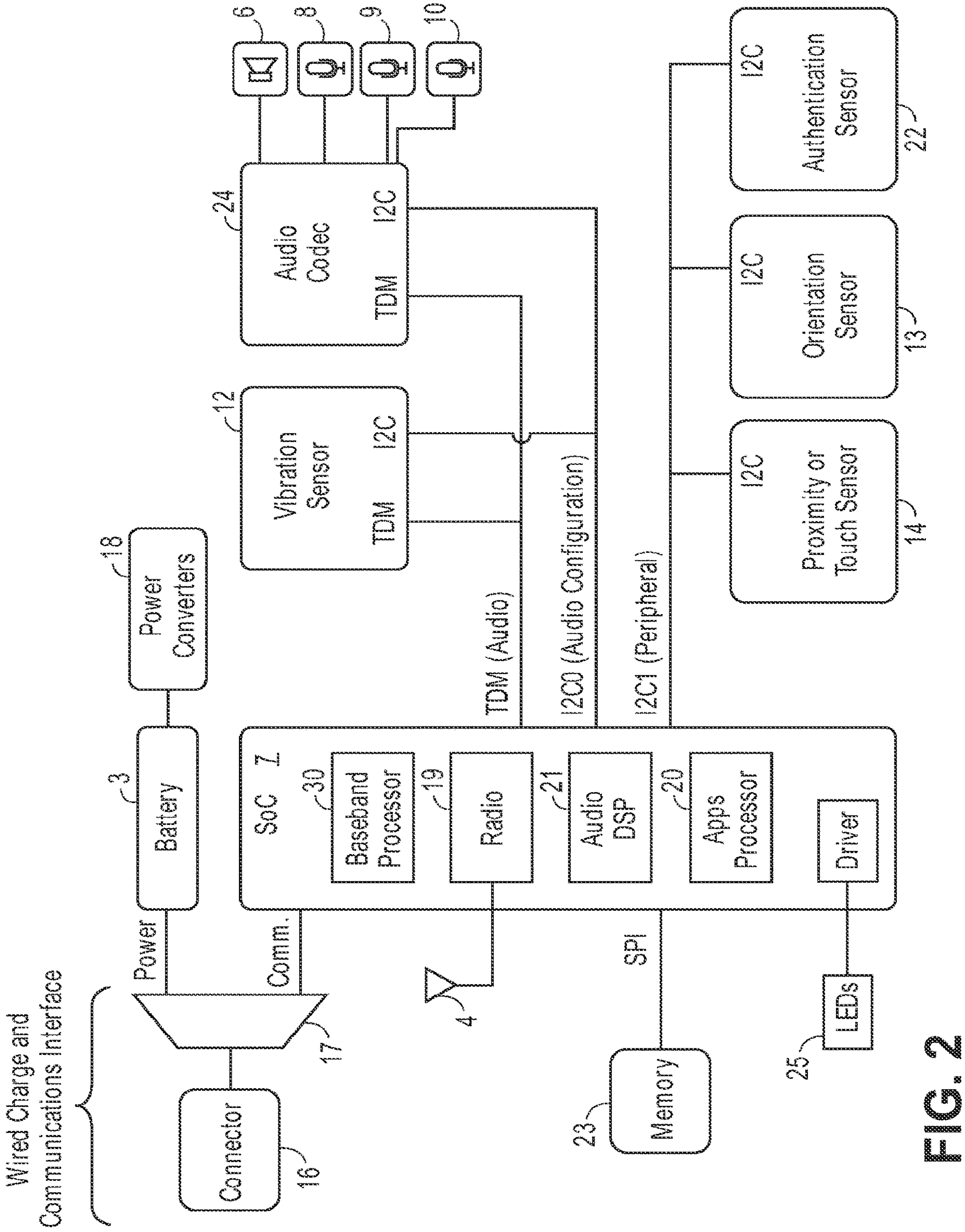
FIG. 2 is a block diagram of hardware components that perform relevant electronic functions in the earphone.

Referring now to FIG. 2, a block diagram of the hardware components that are relevant to some of the electronic functionality (of the electronic circuitry in the housing 2) in one embodiment of the earphone 1 is shown. A wired charge and communications interface encompasses the connector 16 (e.g., a two-pin connector) and a separator circuit 17. A current path from the connector 16 passes through the separator circuit 17, to power the battery 3 and provide a communications signal to a system on a chip (SoC) 7. In one embodiment, the communications signal is present at the same time as dc power, on the same connector pin. A number of power converters 18 including a step down converter and also perhaps a boost converter are provided, as needed to adjust the battery voltage and regulate it, and/or provide a boosted voltage when necessary, to supply power to the various components described here.

The SoC 7 in this case includes the following components, but it should be understood that in general one or more of these components may be off-chip to the SoC 7 or even omitted from the earphone. In this example, the SoC includes a baseband communications processor 30 that will be used to perform digital signal processing (e.g., channel coding) for digital communications with an external audio source device, using a radio transceiver 19 and a coupled antenna 4 (e.g., in accordance with a Bluetooth protocol). An audio digital signal processor 21 may serve to enhance the audio content received from the external audio source prior to playback through the speaker driver 6, and to enhance audio content picked up by a vibration sensor 12 (e.g., a wideband accelerometer) such as speech of the user who is wearing the earphone 1, and/or audio content picked up by multiple acoustics microphones 8, 9 10, in accordance with a variety of digital audio algorithms such as acoustic noise cancellation, ambient noise suppression of an uplink communications audio signal, and audio pick up beam forming. An applications processor 20 may serve to maintain general control of the various hardware components in the earphone 1 and perform tasks for which there may not be other processors provided, e.g., power management, high level user interface functions, and low level sensor functions including user authentication (e.g., based on low level data or a signal from a fingerprint authentication sensor 22), orientation detection (based on signals from an orientation sensor 13, e.g., a 3-axis accelerometer or a gyroscope), and proximity and/or touch sensing (based on signals from proximity/touch sensor 14, e.g., infrared and capacitive touch sensor signals). A separate power control stage may also be provided in the SoC 7, either as one of the power converters 18 or as a driver for producing a signal that drives a visual alert interface, for example including light emitting diodes (LEDs) 25.

The SoC 7 has a number of digital communication links between itself and other components including, for example, a memory 23 (e.g., non-volatile memory such as flash memory) which may serve to store an operating system program and application programs, through a serial peripheral interface (SPI) or other suitable component interconnect interface. The SoC 7 in this example also needs to communicate with a number of other components, including the vibration sensor 12 for purposes of detecting bone conduction vibrations during speech of the wearer, an audio codec 24 which may serve to translate audio signals between digital domain and analog domain (while driving the speaker driver 6 and receiving acoustic pickup signals from the microphones 8, 9, 10), and the proximity/touch, orientation and authentication sensors 14, 13, 22. As an example, I2C inter-integrated circuit bus technology may be used for such links, e.g., for the delivery of audio pickup and playback configuration settings. A separate communication bus, such as a time division multiplexed (TDM) bus, may be needed for collecting audio signals from the vibration sensor 12 and from the acoustic microphones 8, 9, 10.

It should be noted that the components of the SoC 7 described above may be implemented in a form other than as part of a system on a chip, as microelectronic circuitry of different types (e.g., as the combination of a central processing unit (CPU), chipset, and an I/O processor).

Figure 3:
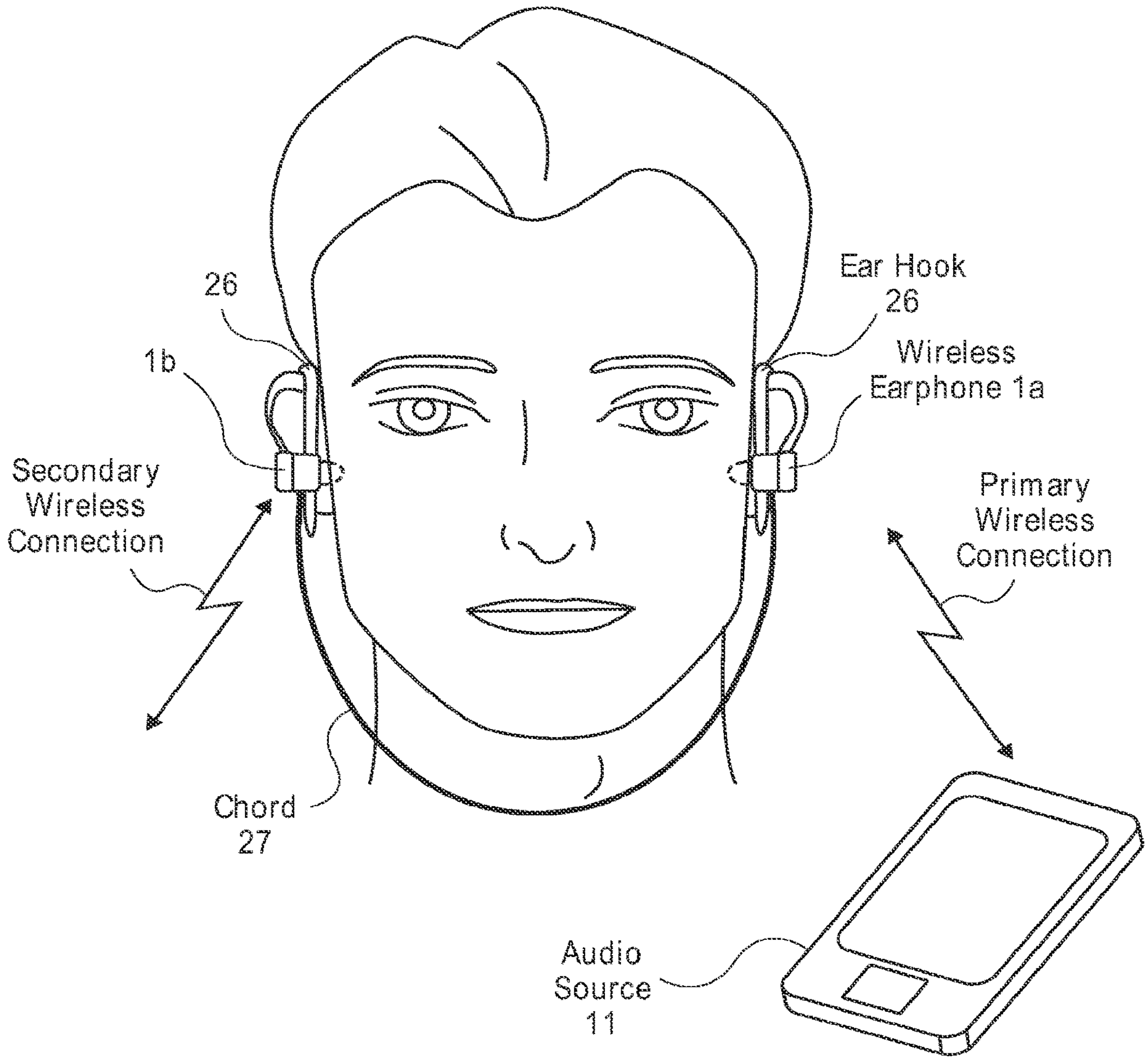
FIG. 3 shows the wireless earphone being worn by its user and having established a wireless connection with a nearby audio source device.

As mentioned earlier, the audio signals for playback through the speaker driver 6, be it for example a downlink audio signal during a voice or video telephony call, or a prerecorded or a live broadcast (streaming) audio or audio/ video program, are received over-the-air from an audio source device 11—see FIG. 3. As seen in FIG. 3, the wireless earphone 1 may be worn by a user who also has access to the audio source device 11 which may be a smartphone, a tablet computer, a desktop computer, or other audio source device that can establish a primary, two-way wireless connection or link with the wireless earphone 1. As seen in FIG. 2, this wireless connection can be established using a suitable radio transceiver 19 that is coupled to an antenna 4, e.g., a pairing of the earphone 1 and the audio source device 11 in accordance with Bluetooth wireless technology. Other wireless techniques for exchanging data over relatively short distances, e.g., at up to 3 (three) meters, from either a fixed or mobile audio source device are possible.

In the case where the user wishes to wear an additional wireless earphone 1*b*, as part of a left and right pair as shown in FIG. 3, a secondary wireless connection is needed to deliver an audio signal to the speaker driver 6 of the additional wireless earphone 1*b*. Generally, the wireless earphone 1*b* may be similar to wireless earphone 1*a* in terms of functionality and constituent hardware components that were described above, except that the manner in which the audio signal of wireless earphone 1*b* is obtained may be different. For example, in one embodiment, the earphone 1*b* need not establish a two-way wireless link with the audio source device 11, but rather can establish a one-way wireless connection by snooping or effectively "listening" to pick up the audio data content that is being communicated between the audio source device 11 and the wireless earphone 1*a* (through the primary connection). In such a case, the wireless earphone 1*a* may wirelessly configure the wireless earphone 1*b* to be able to snoop the primary connection, so that, for example, the wireless earphone 1*b* can obtain a second audio channel, e.g., as part of stereo content, where the second audio channel and a first audio channel are being transmitted by the audio source 11 to the wireless earphone 1*a* in the primary wireless connection. Other ways of obtaining the audio signal through the secondary wireless connection with the radio transceiver of the wireless earphone 1*b*, for driving the speaker driver 6 of the wireless earphone 1*b*, are possible.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the bud portion of the housing 2 described above may be of a rigid material that is suitable for a loose-fitting ear bud, an alternative here is to design the bud portion to perform as an in-ear sealed-type ear bud, with the addition of the flexible tip 15 to assist in achieving a full acoustic (air) seal against the outer ear canal of the wearer. In another example, although the dotted line drawn in FIG. 1 to delineate where the stem and bud portions come together implies that the microphone 9 is located at the near end opening of the stem portion, and that the antenna 4 is in the bud portion, the positioning of the microphone 9 and the antenna 4 can be different so long as they serve their main purposes, namely the pickup of ambient or background sound outside the ear, and the pickup of radio frequency (RF) radiation of the primary or secondary wireless connection. The description is thus to be regarded as illustrative instead of limiting.

What is claimed is:

1. A wireless earphone comprising:

a housing having a first portion and a second portion, wherein the first portion comprises a far end, a near end, a sound outlet at the far end, and wherein the second portion abuts the first portion;

a speaker driver positioned within the first portion;

electronic circuitry positioned within the housing that includes a wireless communications interface to receive audio content and in response provide an audio signal to the speaker driver;

a rechargeable power source positioned within the housing connected to the electronic circuitry;

a first microphone positioned within the first portion;

a second microphone positioned within the second portion and acoustically coupled to an acoustic port at an end of the second portion; and a third microphone positioned inside the housing, between the first microphone and the second microphone, and wherein the first microphone is closer to the speaker driver than the second microphone, and wherein at least one of the second microphone or the third microphone is operable to pick up ambient sound outside of an ear for performing acoustic noise cancellation.

2. The wireless earphone of claim 1 wherein the first microphone, the second microphone and the third microphone face different directions.

3. The wireless earphone of claim 1 wherein the third microphone is operable to pick up ambient sound outside of the ear.

4. The wireless earphone of claim 1 wherein the first portion is dimensioned to fit within the ear and comprises a face portion that extends between the far end and the near end of the first portion, and the face portion is positioned behind and in contact with a tragus of the ear when the first portion is within the ear.

5. The wireless earphone of claim 1 wherein the first portion comprises a center axis through the sound outlet, and the second portion comprises a longitudinal axis that is at an angle to the center axis.

6. The wireless earphone of claim 1 wherein a cavity in the second portion is open to a cavity in the first portion and a plurality of wires pass from the cavity in the second portion to the cavity in the first portion to supply power to the electronic circuitry.

7. The wireless earphone of claim 1 wherein the first portion comprises a spout, and a flexible tip is coupled to the spout, and the flexible tip is dimensioned to be inserted into the ear.

8. The wireless earphone of claim 1 further comprising a vibration sensor positioned inside a cavity of the first portion, wherein the vibration sensor is operable to detect bone conduction vibrations during speech of a wearer of the earphone.

9. The wireless earphone of claim 1 wherein the earphone further comprises a connector positioned in the second portion, wherein the connector is coupled to a) the rechargeable power source, for charging the power source from an external power source, and b) the electronic circuitry, for data communications with an external device.

10. A wireless earphone comprising:

a housing having an in-ear portion that shares a cavity with an elongated portion, and the in-ear portion is sized and dimensioned to fit within an ear and comprises a far end having a sound outlet and a near end that abuts the elongated portion;

a speaker driver positioned within a portion of the cavity defined by the in-ear portion;

electronic circuitry positioned within the cavity, the electronic circuitry comprising a wireless communications interface to receive audio content over-the-air and, in response, provide an audio signal to the speaker driver;

a first microphone positioned within the portion of the cavity defined by the in-ear portion;

a second microphone positioned within a portion of the cavity defined by the elongated portion;

a touch sensor positioned within the cavity; and a processor operable to control the wireless earphone based on a signal from the touch sensor.

11. The wireless earphone of claim 10 wherein the audio content comprises a speech of a wearer.

12. The wireless earphone of claim 10 wherein the processor is further operable to perform acoustic noise cancellation based on ambient sound outside the ear picked up by the first microphone or the second microphone.

13. The wireless earphone of claim 10 further comprising a rechargeable power source positioned between the second microphone and the speaker driver.

14. The wireless earphone of claim 10 wherein when the sound outlet is positioned within the ear, a longitudinal axis of the elongated portion is vertical, while a center axis of the sound outlet is horizontal.

15. The wireless earphone of claim 10 further comprising a third microphone positioned inside the housing for pickup of ambient sound outside of the ear.

16. A wireless earphone comprising:

a housing having a first portion and a second portion, wherein the first portion comprises a far end, a near end, a primary sound outlet at the far end, and wherein the second portion abuts the first portion;

a speaker driver positioned within the first portion;

electronic circuitry positioned within the housing that includes a wireless communications interface to receive audio content over-the-air and in response provides an audio signal to the speaker driver;

a first microphone positioned within a cavity of the first portion;

a second microphone positioned within a cavity of the second portion;

an orientation sensor positioned within the cavity of the first portion; and a processor operable to control the wireless earphone based on a signal from the orientation sensor.

17. The wireless earphone of claim 16 wherein the speaker driver is positioned within the cavity of the first portion and a rechargeable power source is positioned between the speaker driver and the second microphone.

18. The wireless earphone of claim 16 wherein the first portion is dimensioned to fit within an ear and comprises a face portion that extends between the far end and the near end of the first portion, and the face portion is positioned behind and in contact with a tragus of the ear when the first portion is within the ear.

19. The wireless earphone of claim 16 wherein the first portion comprises a center axis through the primary sound outlet, and the second portion comprises a longitudinal axis that is at an angle to the center axis.

20. The wireless earphone of claim 16 further comprising a third microphone positioned within the housing between the first microphone and the second microphone for pickup of ambient sound outside of an ear.

* * * * *